United States Patent
Kobayashi et al.

(10) Patent No.: US 12,277,922 B2
(45) Date of Patent: Apr. 15, 2025

(54) CANCEL FILTER COEFFICIENT SELECTING APPARATUS, CANCEL FILTER COEFFICIENT SELECTING METHOD, AND PROGRAM

(71) Applicant: NIPPON TELEGRAPH AND TELEPHONE CORPORATION, Tokyo (JP)

(72) Inventors: Kazunori Kobayashi, Tokyo (JP); Noriyoshi Kamado, Tokyo (JP); Masahiro Fukui, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 256 days.

(21) Appl. No.: 17/924,908

(22) PCT Filed: Dec. 14, 2020

(86) PCT No.: PCT/JP2020/046498
§ 371 (c)(1),
(2) Date: Nov. 11, 2022

(87) PCT Pub. No.: WO2021/234987
PCT Pub. Date: Nov. 25, 2021

(65) Prior Publication Data
US 2023/0197054 A1     Jun. 22, 2023

(30) Foreign Application Priority Data
May 18, 2020   (WO) ............... PCT/JP2020/019629

(51) Int. Cl.
*G10K 11/178* (2006.01)
*G06V 20/59* (2022.01)
*G06V 40/16* (2022.01)

(52) U.S. Cl.
CPC ...... *G10K 11/17881* (2018.01); *G06V 20/593* (2022.01); *G06V 40/172* (2022.01); *G10K 11/17853* (2018.01)

(58) Field of Classification Search
CPC ....... G10K 11/17881; G10K 11/17853; G06V 40/172; G06V 20/593
(Continued)

(56) References Cited

U.S. PATENT DOCUMENTS 5,133,017 A * 7/1992 Cain ............... G10K 11/17881
381/71.4
5,267,320 A * 11/1993 Fukumizu ........ G10K 11/17857
381/71.12
(Continued)

FOREIGN PATENT DOCUMENTS

JP    05011771 A    1/1993
JP    05273987 A    10/1993
(Continued)

OTHER PUBLICATIONS

Active Noise Control (Institute of Electronics, Information and Communication Engineers "Forest of Knowledge" Group 2-Section 6-Chapter 6), [online], [searched for on Apr. 27, 2020], Internet <URL: http://www.ieice-hbkb.org/files/02/02gun_06hen_06.pdf> with English translation generated by computer.

*Primary Examiner* — Paul Kim
*Assistant Examiner* — Douglas J Suthers

(57) ABSTRACT

Provided is a technique for selecting a cancellation filter coefficient that can stably cancel noise for a user using a seat of an aircraft, an automobile, or the like. A cancellation filter coefficient selection apparatus includes: a recording unit configured to record cancellation filter coefficients; a seat position acquisition unit configured to acquire a position of a seat used by a user; and a cancellation filter coefficient selection unit configured to, from among the cancellation
(Continued)

filter coefficients recorded in the recording unit, select a cancellation filter coefficient corresponding to the position of the seat as a cancellation filter coefficient to be used in filtering for generating a cancellation signal for cancelling noise at a position where quiet is desired, based on a reference signal output by a reference microphone configured to collect noise in a predetermined space. The reference microphone and a speaker for emitting sound based on the cancellation signal are installed on the seat, and positions of the reference microphone and the speaker in the predetermined space change accompanying movement of the seat.

3 Claims, 12 Drawing Sheets

(58) Field of Classification Search
USPC .......................................................... 381/71.4
See application file for complete search history.

(56) References Cited

U.S. PATENT DOCUMENTS

| | | | |
|---|---|---|---|
| 7,885,417 B2* | 2/2011 | Christoph | G10K 11/17827 |
| | | | 381/71.4 |
| 2011/0235839 A1* | 9/2011 | Koike | H04S 7/303 |
| | | | 381/333 |
| 2016/0329040 A1* | 11/2016 | Whinnery | G10K 11/17853 |

FOREIGN PATENT DOCUMENTS

| | | |
|---|---|---|
| JP | 07104770 A | 4/1995 |
| JP | 2006293909 A | 10/2006 |
| JP | 2011205487 A | 10/2011 |

* cited by examiner

US 12,277,922 B2

CANCEL FILTER COEFFICIENT SELECTING APPARATUS, CANCEL FILTER COEFFICIENT SELECTING METHOD, AND PROGRAM

CROSS-REFERENCE TO RELATED APPLICATIONS

This application is a U.S. National Stage Application filed under 35 U.S.C. §371 claiming priority to International Patent Application No. PCT/JP2020/046498, filed on 14 Dec. 2020, which application claims priority to and the benefit of International Patent Application No. PCT/JP2020/019629, filed on 18 May 2020, the disclosures of which are hereby incorporated herein by reference in their entireties.

TECHNICAL FIELD

The present invention relates to an active noise control technique.

BACKGROUND ART

As a system for cancelling noise using an active noise control technique (hereinafter referred to as a noise cancellation system), for example, a system as described in NPL 1 has been disclosed. It is discussed later.

Hereinafter, a noise cancellation system 900 will be described with reference to FIGS. 1 and 2. FIG. 1 is a block diagram showing a configuration of the noise cancellation system 900. FIG. 2 is a flowchart showing operations of the noise cancellation system 900. As shown in FIG. 1, the noise cancellation system 900 includes a reference microphone 910, an error microphone 920, a cancellation filter coefficient generation apparatus 930, a cancellation filter 940, and a speaker 950.

Note that although FIG. 1 shows a configuration in which the noise cancellation system 900 includes one reference microphone 910 and one speaker 950, the noise cancellation system 900 is not limited thereto, and the noise cancellation system 900 may also have a configuration including reference microphones 910 of M channels and speakers 950 of N channels (M and N are each an integer of 1 or more).

The operation of the noise cancellation system 900 will be described with reference to FIG. 2.

In S910, the reference microphone 910 collects noise in a predetermined space and outputs a reference signal. Here, the predetermined space is a space in which a noise source is present. The reference microphone 910 collects sound from the noise source.

In S920, the error microphone 920 collects sound at a position where quiet is desired and outputs an error signal. The error microphone 920 collects the sound from the noise source and the sound from the speaker 950, which serves as a secondary sound source.

In S930, a cancellation filter coefficient generation apparatus 930 generates and outputs a cancellation filter coefficient using the reference signal output in S910 and the error signal output in S920 as inputs. Here, the cancellation filter coefficient is used in filtering for generating a cancellation signal for cancelling noise at a position where quiet is desired, based on the reference signal.

In S940, the cancellation filter 940 receives the reference signal output in S910 and the cancellation filter coefficient output in S930 as inputs, and generates and outputs a cancellation signal based on the reference signal through filtering using the cancellation filter coefficient. Here, the cancellation signal is a signal for cancelling noise at a position where quiet is desired, and is a signal input to the speaker 950.

In S950, the speaker 950 receives the cancellation signal output in S940 as an input and emits sound based on the cancellation signal. Here, the sound based on the cancellation signal is a sound having an antiphase relationship with the noise at the position where quiet is desired.

Hereinafter, the cancellation filter coefficient generation apparatus 930 will be described with reference to FIGS. 3 and 4. FIG. 3 is a block diagram showing the configuration of the cancellation filter coefficient generation apparatus 930. FIG. 4 is a flowchart showing the operation of the cancellation filter coefficient generation apparatus 930. As shown in FIG. 3, the cancellation filter coefficient generation apparatus 930 includes a path filter 931 and a cancellation filter coefficient generation unit 932.

The operation of the cancellation filter coefficient generation apparatus 930 will be described with reference to FIG. 4.

In S931, the path filter 931 receives the reference signal output in S910 as an input, and generates and outputs a filtered reference signal based on the reference signal through filtering using a path filter coefficient representing an acoustic characteristic of the path from the speaker 950 to the error microphone 920.

In S932, the cancellation filter coefficient generation unit 932 receives the error signal output in S920 and the filtered reference signal output in S931 as inputs, and generates and outputs a cancellation filter coefficient based on the error signal and the filtered reference signal. Here, as an adaptive algorithm for sequentially generating the cancellation filter coefficient, for example, an LMS (Least Mean Squares) algorithm, an NLMS (Normalized Least Mean Squares) algorithm, an RLS (Recursive Least Squares) algorithm, and a projection algorithm described in Reference PLT 1 can be used.

(Reference PLT 1: Japanese Patent Application Laid-Open No. 2006-135886)

These adaptive algorithms learn the cancellation filter coefficient to minimize the squared average of the error signal, and therefore noise at the installation position of the error microphone 920 is minimized, and a quiet space in which the noise level is small is created around the installation position of the error microphone 920.

CITATION LIST

Non-Patent Literature

[NPL 1] Active Noise Control (Institute of Electronics, Information and Communication Engineers "Chishiki no Mori" Group 2—Volume 6—Chapter 6), [online], [searched for on Apr. 27, 2020], Internet <URL: http://www.ieice-hbkb.org/files/02/02gun_06hen_06.pdf>

SUMMARY OF THE INVENTION

Technical Problem

The noise cancellation system 900 can be installed, for example, on a seat of an aircraft, an automobile, or the like. In this case, the reference microphone 910 and the error microphone 920 are installed near the head of the user using the seat, but operations for noise cancellation performed by the noise cancellation system 900 may become unstable, such as noise increasing due to the cancellation filter coefficient being learned adaptively also for a sound from a source other than a noise source, such as the user's voice.

Also, when the reference microphone 910, the error microphone 920, and the speaker 950 are installed on a seat having a reclining mechanism, the spatial positions of the reference microphone 910, the error microphone 920, and the speaker 950 change. As a result, the acoustic characteristic of the path from the speaker 950 to the error microphone 920 may change significantly, causing deviation between the path filter coefficient set in advance in the path filter 931 and the actual acoustic characteristics, whereby learning of the cancellation filter coefficient may become unstable.

In view of this, an object of the present invention is to provide a technique for selecting a cancellation filter coefficient that can stably cancel noise for a user using a seat of an aircraft, an automobile, or the like.

Means for Solving the Problem

One aspect of the present invention is a cancellation filter coefficient selection apparatus including: a recording unit configured to record cancellation filter coefficients; a seat position acquisition unit configured to acquire a position of a seat used by a user; and a cancellation filter coefficient selection unit configured to, from among the cancellation filter coefficients recorded in the recording unit, select a cancellation filter coefficient corresponding to the position of the seat as a cancellation filter coefficient to be used in filtering for generating a cancellation signal for cancelling noise at a position where quiet is desired, based on a reference signal output by a reference microphone configured to collect noise in a predetermined space, in which the reference microphone and a speaker for emitting sound based on the cancellation signal are installed on the seat, and positions of the reference microphone and the speaker in the predetermined space change accompanying movement of the seat.

One aspect of the present invention is a cancellation filter coefficient selection apparatus, in which a signal output by a reference microphone for collecting noise in a predetermined space is used as a reference signal, a signal output by an error microphone for collecting sound at a position where quiet is desired is used as an error signal, and a signal generated by filtering the reference signal using a cancellation filter coefficient selected immediately previously is used as a cancellation signal, the cancellation filter coefficient selection apparatus including: a recording unit configured to record cancellation filter coefficients; a first path filter configured to generate a filtered cancellation signal based on the cancellation signal through filtering using a path filter coefficient indicating an acoustic characteristic of a path from a speaker for emitting sound based on the cancellation signal to the error microphone; a subtraction unit configured to generate an estimated error signal by subtracting the filtered cancellation signal from the error signal; and a cancellation filter coefficient selection unit configured to use the reference signal and the estimated error signal to select a cancellation filter coefficient for best cancelling noise from among the cancellation filter coefficients recorded in the recording unit.

Effects of the Invention

According to the present invention, it is possible to select a cancellation filter coefficient that can stably cancel noise for a user using a seat of an aircraft, an automobile, or the like.

DESCRIPTION OF EMBODIMENTS

Hereinafter, embodiments of the present invention will be described in detail. Note that components having the same function are denoted by the same number, and redundant description is omitted.

Prior to the description of each embodiment, the notation method in this specification will be described.

A "^" (caret) represents a superscript. For example, $x^{y^z}$ means that $y^z$ is a superscript to x, and $x_{y^z}$ means that $y^z$ is a subscript to x. Also, "_" (underscore) represents a subscript. For example, $x^{y\_z}$ indicates that $y_z$ is a superscript to x, and $x_{y\_z}$ indicates that $y_z$ is a subscript to x.

Superscripts "^" and "~" such as ^x and ~x for a certain character x were originally to be written directly above "x", but due to restriction on the description notation in the specification, they are written as ^x and ~x.

First Embodiment

Figure 1:
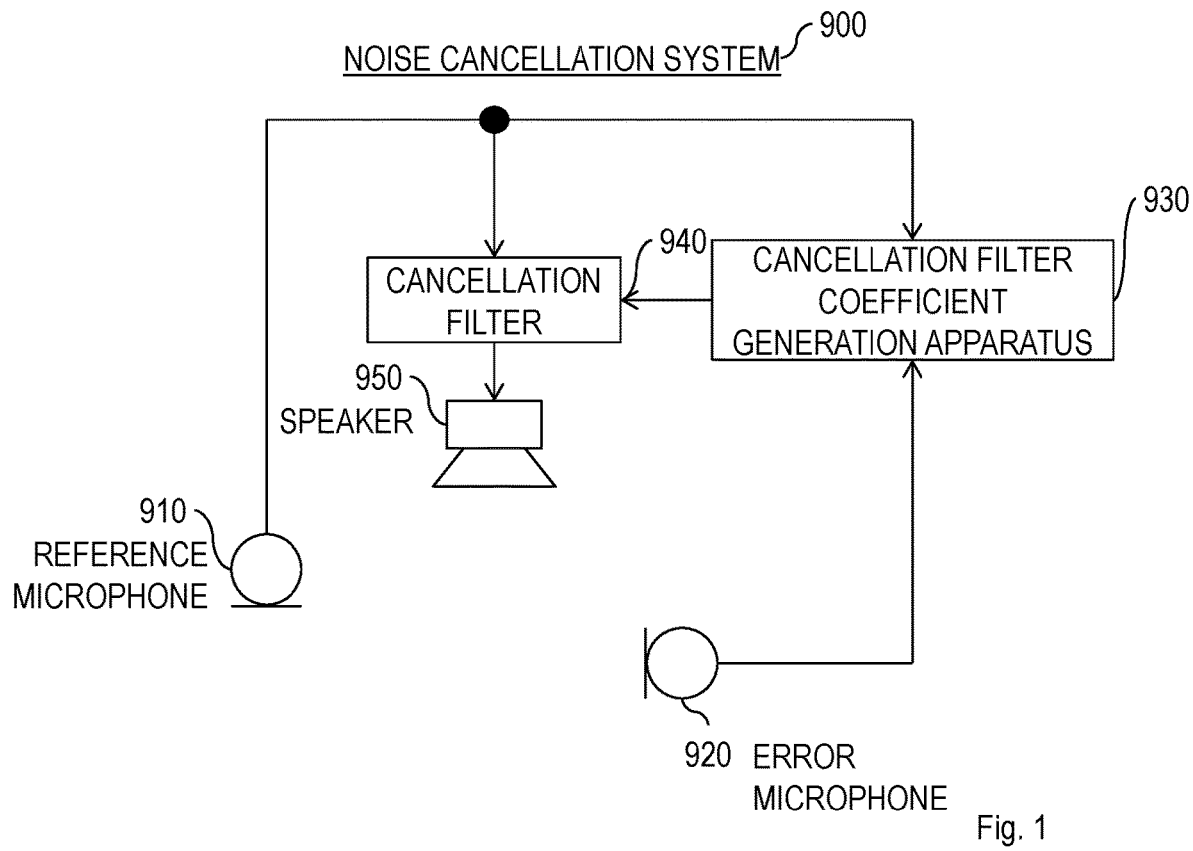
FIG. 1 is a block diagram showing an example of a configuration of a noise cancellation system 900.
Figure 2:
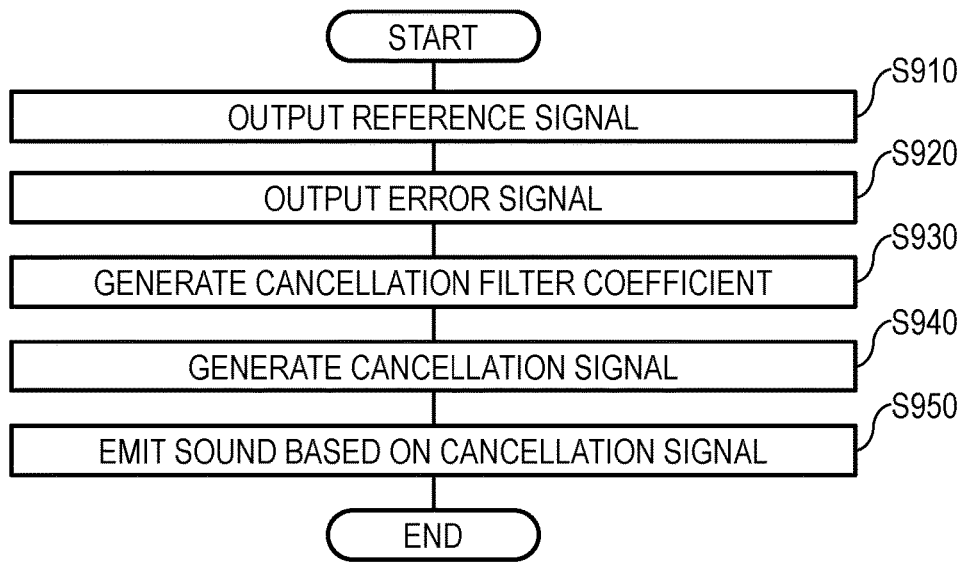
FIG. 2 is a flowchart showing an example of operation of the noise cancellation system 900.
Figure 3:
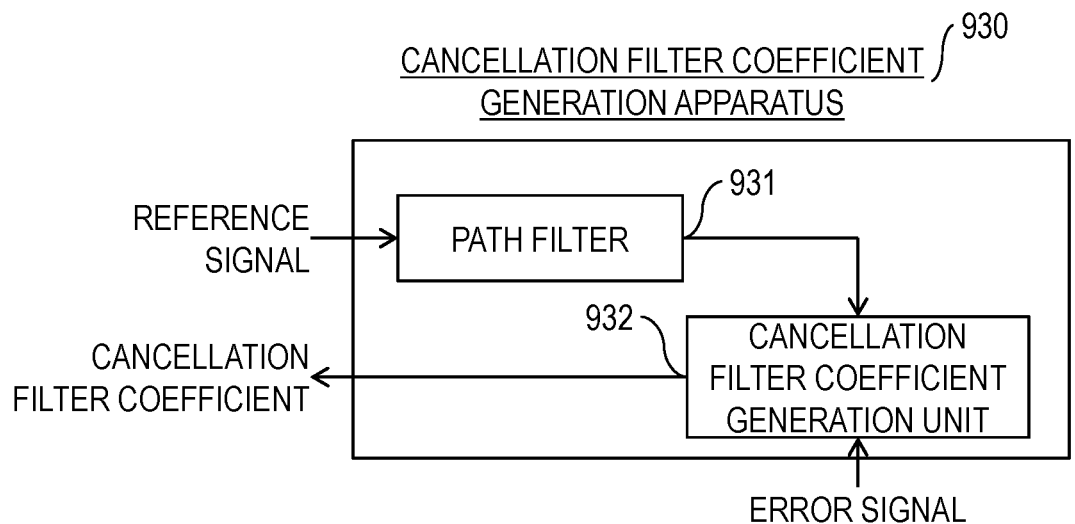
FIG. 3 is a block diagram showing an example of a configuration of a cancellation filter coefficient generation apparatus 930.
Figure 4:
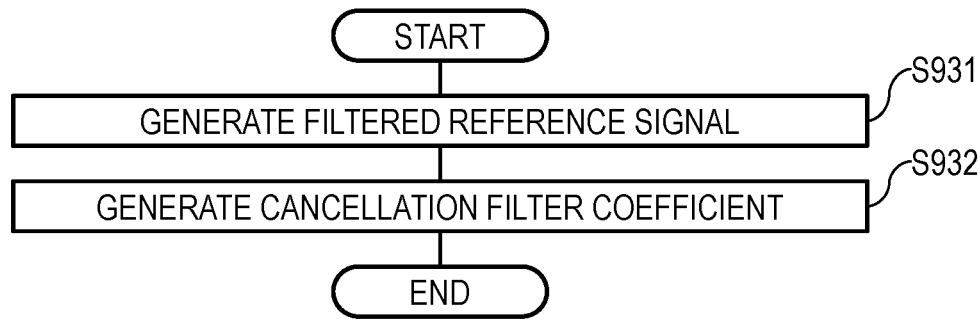
FIG. 4 is a flowchart showing an example of operation of the cancellation filter coefficient generation apparatus 930.
Figure 5:
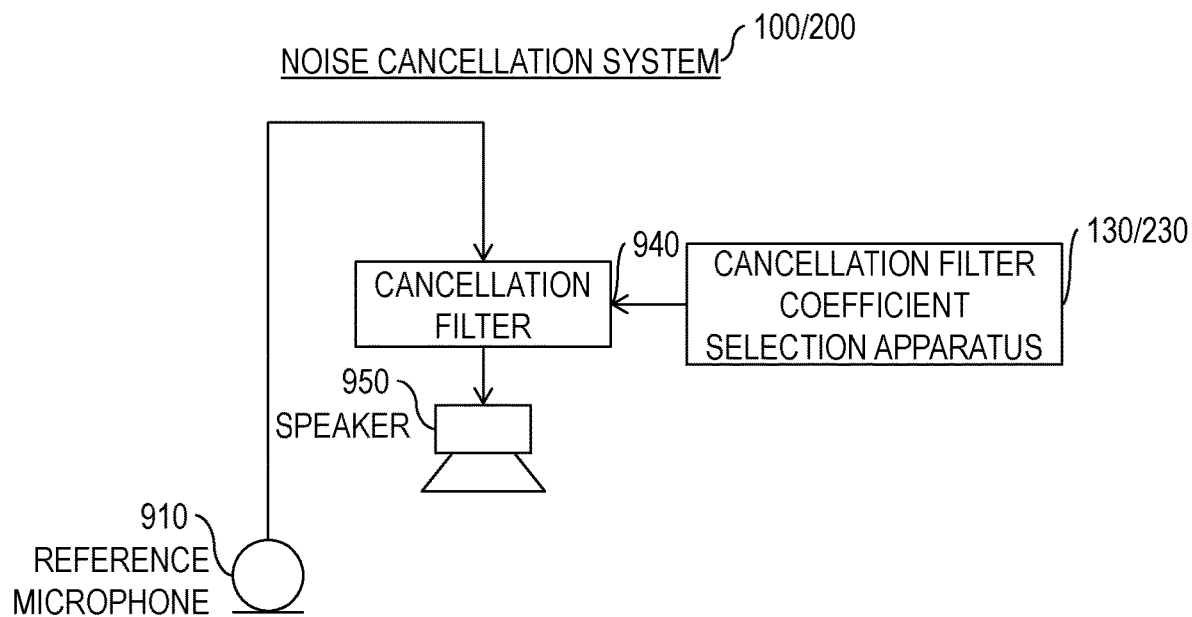
FIG. 5 is a block diagram showing an example of a configuration of a noise cancellation system 100/200.
Figure 6:
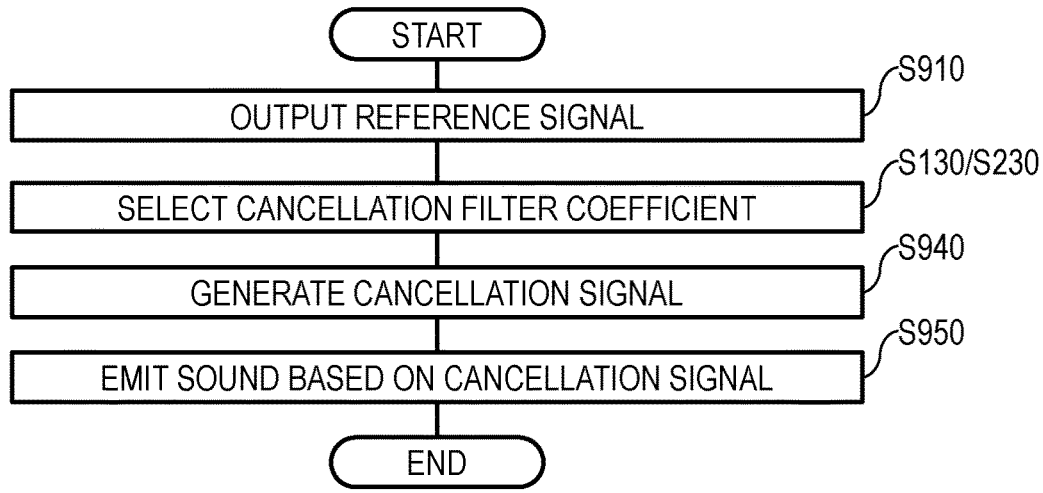
FIG. 6 is a flowchart showing an example of operation of the noise cancellation system 100/200.

Hereinafter, a noise cancellation system 100 will be described with reference to FIGS. 5 and 6. FIG. 5 is a block diagram showing a configuration of the noise cancellation system 100. FIG. 6 is a flowchart showing operation of the noise cancellation system 100. As shown in FIG. 5, the noise cancellation system 100 includes a reference microphone 910, a cancellation filter coefficient selection apparatus 130, a cancellation filter 940, and a speaker 950.

The operation of the noise cancellation system 100 will be described with reference to FIG. 6.

In S910, the reference microphone 910 collects noise in a predetermined space and outputs a reference signal.

In S130, the cancellation filter coefficient selection apparatus 130 selects and outputs a cancellation filter coefficient corresponding to a position of a seat used by a user.

In S940, the cancellation filter 940 receives the reference signal output in S910 and the cancellation filter coefficient output in S130 as inputs, and generates and outputs a cancellation signal based on the reference signal through filtering using the cancellation filter coefficient.

In S950, the speaker 950 receives the cancellation signal output in S940 as an input and emits sound based on the cancellation signal.

Figure 7:
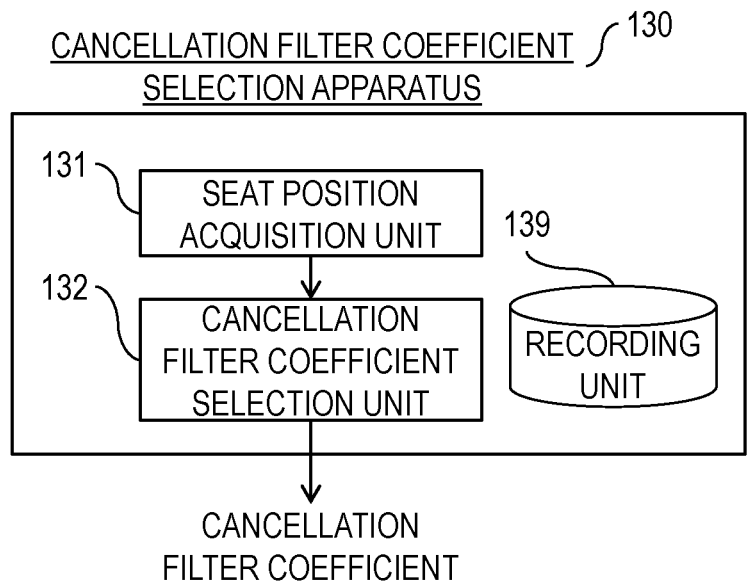
FIG. 7 is a block diagram showing an example of a configuration of a cancellation filter coefficient selection apparatus 130.
Figure 8:
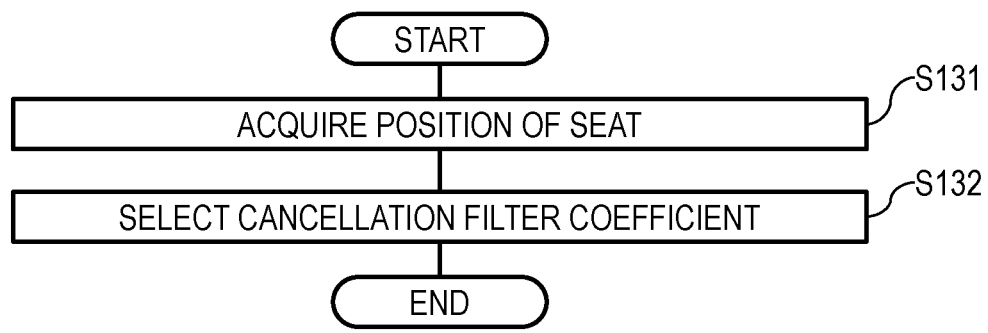
FIG. 8 is a flowchart showing an example of operation of the cancellation filter coefficient selection apparatus 130.

Hereinafter, the cancellation filter coefficient selection apparatus 130 will be described with reference to FIGS. 7 and 8. FIG. 7 is a block diagram showing a configuration of the cancellation filter coefficient selection apparatus 130. FIG. 8 is a flowchart showing operation of the cancellation filter coefficient selection apparatus 130. As shown in FIG. 7, the cancellation filter coefficient selection apparatus 130 includes a seat position acquisition unit 131, a cancellation filter coefficient selection unit 132, and a recording unit 139. In the recording unit 139, one or more cancellation filter coefficients corresponding to the positions of the seat used by the user are recorded in advance.

Figure 9:
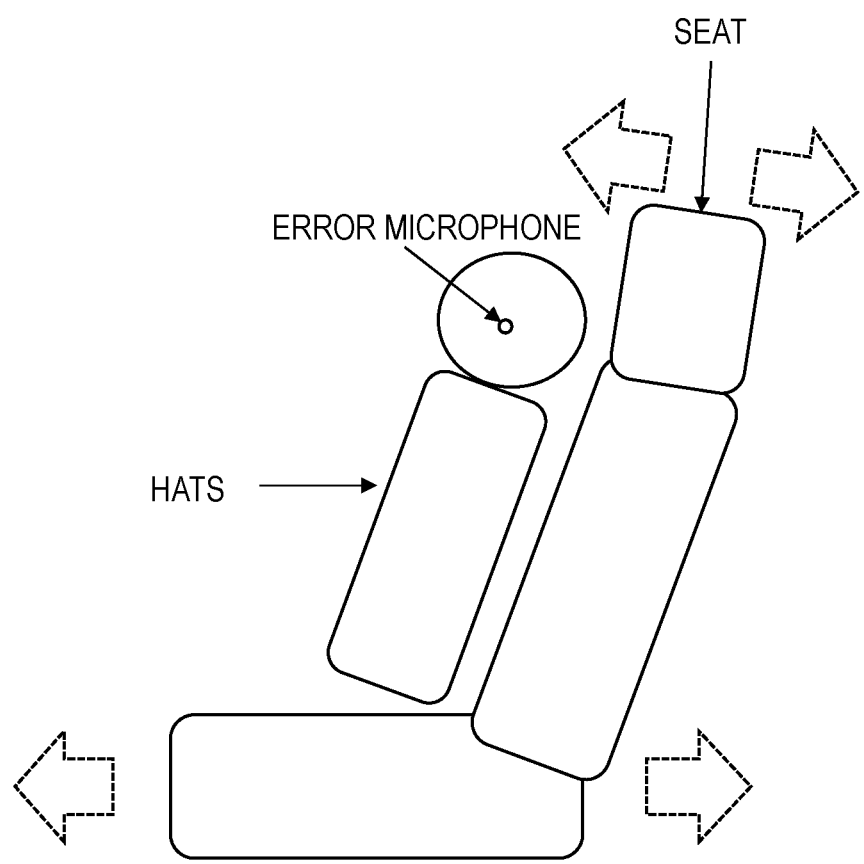
FIG. 9 is a diagram showing an example of pre-generation of a cancellation filter coefficient.
Figure 10:
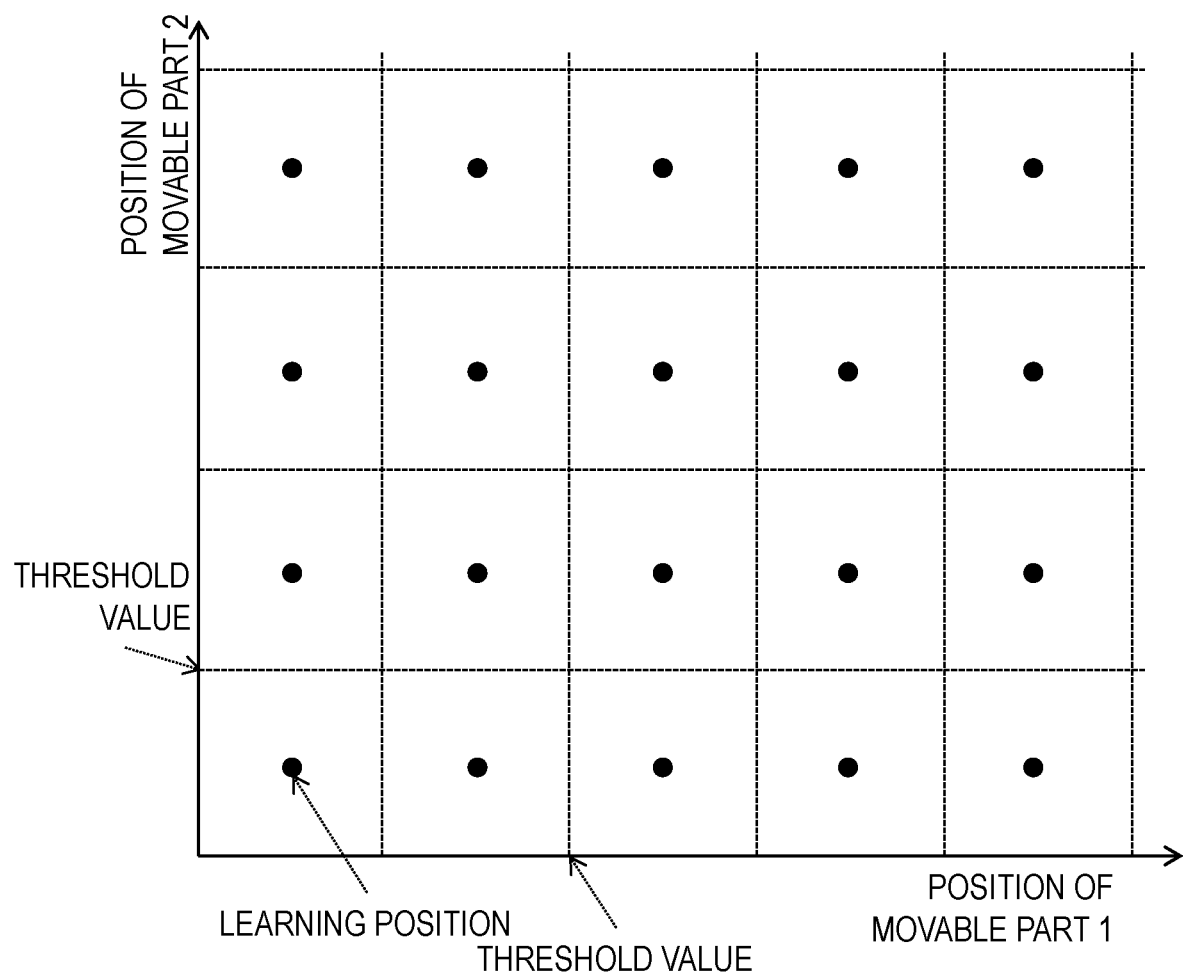
FIG. 10 is a diagram showing an example of pre-generation of a cancellation filter coefficient.

Hereinafter, a method for generating a cancellation filter coefficient recorded in advance in the recording unit 139 will be described. For example, as shown in FIG. 9, in an actual noise environment, an error microphone is installed at a position of an ear of a Head and Torso Simulator (HATS) placed in the seat used by the user, and the cancellation filter coefficient is generated using a method that is the same as that of the cancellation filter coefficient generation apparatus 930. Then, the cancellation filter coefficient resulting from sufficient learning performed by an adaptive algorithm is recorded in the recording unit 139. This task is repeated while changing the position of the seat using a reclining mechanism. For example, if there are two movable parts (seat surface and backrest) as in the seat shown in FIG. 9, as shown in FIG. 10, a cancellation filter coefficient is generated and recorded for each area divided by setting a plurality of threshold values at the positions of the movable parts. Accordingly, the recording unit 139 records a set of a position of the seat and a cancellation filter coefficient at that position. In the example of FIG. 10, 20 cancellation filter coefficients are recorded.

The operation of the cancellation filter coefficient generation apparatus 130 will be described with reference to FIG. 8.

In S131, the seat position acquisition unit 131 acquires and outputs the position of the seat used by the user. The seat position acquisition unit 131 acquires the seat position based on, for example, the state of the reclining mechanism of the seat obtained based on the output of a rotary encoder that detects the movement of the seat.

The seat position acquisition unit 131 may also use the position of the user's head instead of the state of the reclining mechanism of the seat. The position of the user's head can be obtained, for example, as a result of face recognition performed on an image captured by a camera installed so that an image of the user's face can be captured. That is, the seat position acquisition unit 131 acquires the position of the seat based on the position of the user's head obtained as a result of the face recognition of the user performed on the image captured by the predetermined camera. Also, the position of the user's head can be obtained, for example, as a result of sensing performed using a millimeter-wave radar or LiDAR (Light Detection and Ranging) (see Reference NPL 1) installed so as to acquire the position of the user's head. That is, the seat position acquisition unit 131 acquires the position of the seat based on the position of the user's head obtained as a result of sensing performed using a predetermined millimeter-wave radar or LiDAR.

(Reference NPL 1: LIDAR, [online], [searched for on Apr. 27, 2020], Internet <URL: https://ja.wikipedia.org/wiki/LIDAR>)

In S132, the cancellation filter coefficient selection unit 132 receives the seat position output in S131 as an input, and from among the cancellation filter coefficients recorded in the recording unit 139, selects and outputs the cancellation filter coefficient corresponding to the position of the seat as the cancellation filter coefficient to be used in filtering for generating a cancellation signal for cancelling noise at a position where quiet is desired, based on the reference signal output by the reference microphone that collects noise in the predetermined space.

According to the embodiment of the present invention, it is possible to select a cancellation filter coefficient that can stably cancel noise for a user using a seat of an aircraft, an automobile, or the like. According to the embodiment of the present invention, since it is not necessary to generate the cancellation filter coefficient at the time of noise cancellation, stable noise cancellation that is not influenced by the voice of the user is possible.

Installation Example

Figure 13:
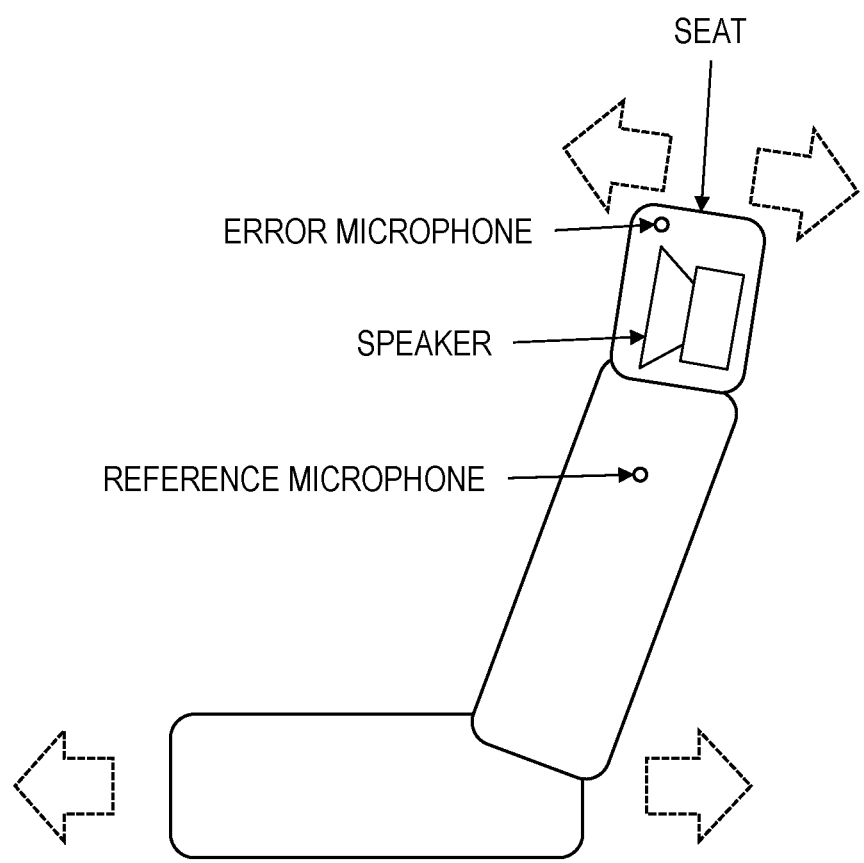
FIG. 13 is a diagram showing an example of installation of a reference microphone, an error microphone, and a speaker.

The reference microphone 910 and the speaker 950 are installed on a moving part of the seat (see FIG. 13). When installed in this manner, the positions of the reference microphone 910 and the speaker 950 in the predetermined space change accompanying movement of the seat. However, according to the embodiment of the present invention, stable noise cancellation is possible regardless of the position change.

Second Embodiment

Hereinafter, a noise cancellation system 200 will be described with reference to FIGS. 5 and 6. FIG. 5 is a block diagram showing a configuration of the noise cancellation system 200. FIG. 6 is a flowchart showing operation of the noise cancellation system 200. As shown in FIG. 5, the noise cancellation system 200 includes a reference microphone 910, a cancellation filter coefficient selection apparatus 230, a cancellation filter 940, and a speaker 950.

The operation of the noise cancellation system 200 will be described with reference to FIG. 6.

In S910, the reference microphone 910 collects noise in the predetermined space and outputs a reference signal.

In S230, the cancellation filter coefficient selection apparatus 230 selects and outputs a cancellation filter coefficient corresponding to the position of the head of the user using the seat.

In S940, the cancellation filter 940 receives the reference signal output in S910 and the cancellation filter coefficient output in S230 as inputs, and generates and outputs a cancellation signal based on the reference signal through filtering using the cancellation filter coefficient.

In S950, the speaker 950 receives the cancellation signal output in S940 as an input and emits sound based on the cancellation signal.

Figure 11:
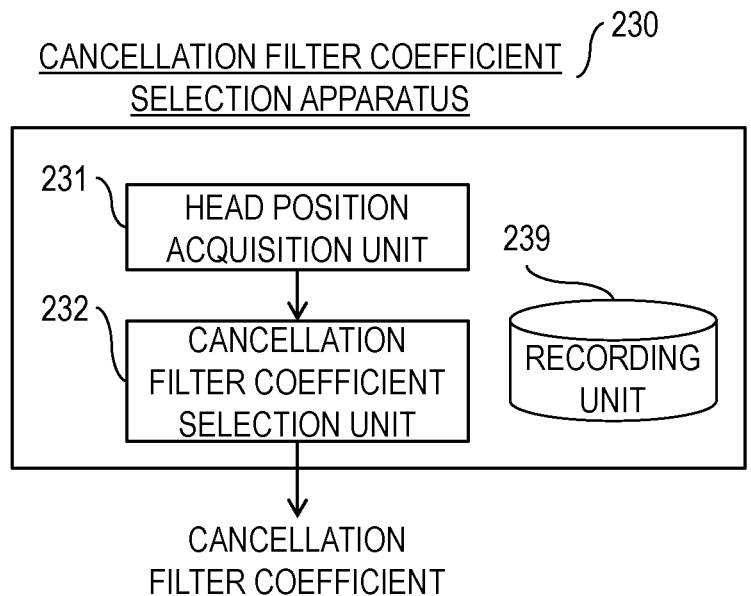
FIG. 11 is a block diagram showing an example of a configuration of a cancellation filter coefficient selection apparatus 230.
Figure 12:
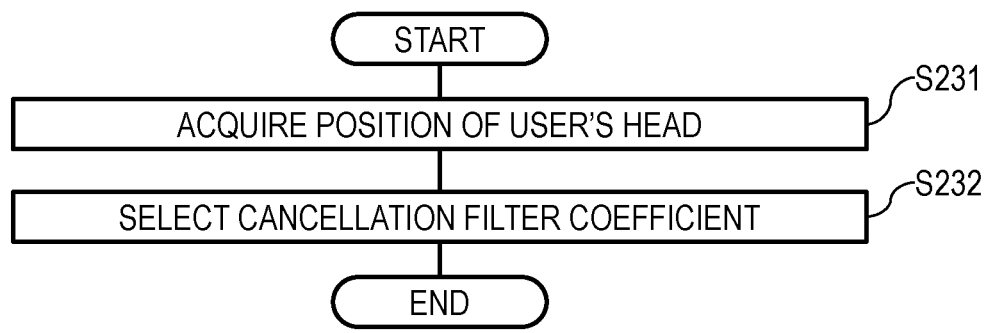
FIG. 12 is a flowchart showing an example of operation of the cancellation filter coefficient selection apparatus 230.

Hereinafter, the cancellation filter coefficient selection apparatus 230 will be described with reference to FIGS. 11 and 12. FIG. 11 is a block diagram showing a configuration of the cancellation filter coefficient selection apparatus 230. FIG. 12 is a flowchart showing operation of the cancellation filter coefficient selection apparatus 230. As shown in FIG. 11, the cancellation filter coefficient selection apparatus 230 includes a head position acquisition unit 231, a cancellation filter coefficient selection unit 232, and a recording unit 239. In the recording unit 239, one or more cancellation filter coefficients corresponding to the positions of the head of the user using the seat are recorded in advance. The method for generating the cancellation filter coefficient recorded in advance in the recording unit 239 may be the same as the method described in the first embodiment. Accordingly, the recording unit 239 records a set of a position of the user's head and a cancellation filter coefficient at that position.

The operation of the cancellation filter coefficient generation apparatus 230 will be described with reference to FIG. 12.

In S231, the head position acquisition unit 231 acquires and outputs the position of the head of the user using the seat. The head position acquisition unit 231 can use, for example, the result of face recognition for an image captured by a camera installed so that an image of the user's face can be captured. That is, the head position acquisition unit 231 acquires the position of the user's head as a result of face recognition of the user performed on an image captured by a predetermined camera. Also, the head position acquisition unit 231 can use the result of sensing performed using a millimeter-wave radar or LiDAR installed so as to acquire the position of the user's head. That is, the head position acquisition unit 231 acquires the position of the user's head as a result of sensing performed using a predetermined millimeter-wave radar or LiDAR.

In S232, the cancellation filter coefficient selection unit 232 receives the position of the user's head output in S231 as an input, and from among the cancellation filter coefficients recorded in the recording unit 239, selects and outputs the cancellation filter coefficient corresponding to the position of the user's head as the cancellation filter coefficient to be used in filtering for generating a cancellation signal for cancelling noise at the position where quiet is desired, based on the reference signal output by the reference microphone that collects noise in a predetermined space.

According to the embodiment of the present invention, it is possible to select a cancellation filter coefficient that can stably cancel noise for a user using a seat of an aircraft, an automobile, or the like. According to the embodiment of the present invention, since it is not necessary to generate the cancellation filter coefficient at the time of noise cancellation, stable noise cancellation that is not influenced by the voice of the user is possible.

Third Embodiment

In the first embodiment and the second embodiment, a mode in which the position of the seat and the position of the head are acquired and the cancellation filter coefficient is selected based on these positions has been described. Here, a mode of selecting the cancellation filter coefficient without acquiring the position of the seat or the position of the head will be described. In the present embodiment, an error microphone is used. The error microphone is installed on the seat along with the reference microphone and speaker, as shown in FIG. 13. Note that the error microphone is preferably installed so as to be close to the user's ear.

Figure 14:
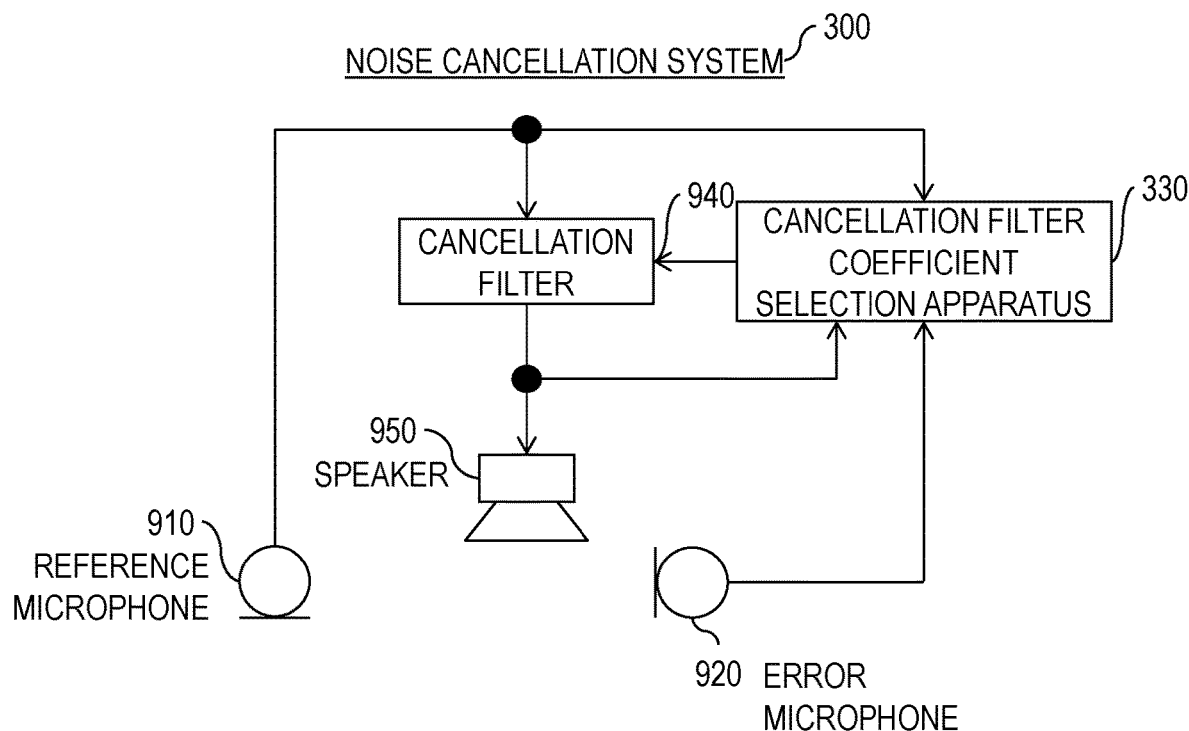
FIG. 14 is a block diagram showing an example of a configuration of a noise cancellation system 300.
Figure 15:
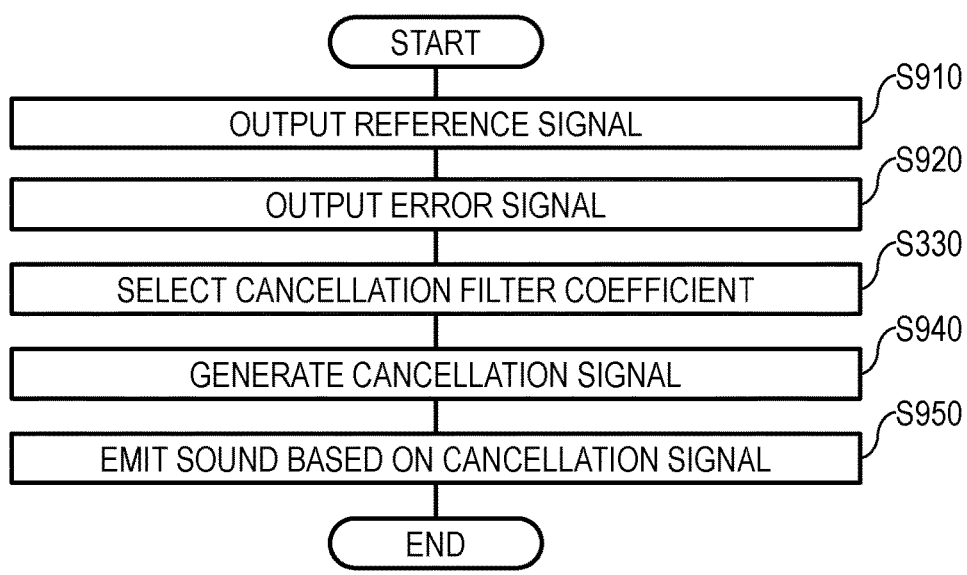
FIG. 15 is a flowchart showing an example of operation of the noise cancellation system 300.

Hereinafter, a noise cancellation system 300 will be described with reference to FIGS. 14 and 15. FIG. 14 is a block diagram showing a configuration of the noise cancellation system 300. FIG. 15 is a flowchart showing operation of the noise cancellation system 300. As shown in FIG. 14, the noise cancellation system 300 includes a reference microphone 910, an error microphone 920, a cancellation filter coefficient selection apparatus 330, a cancellation filter 940, and a speaker 950.

The operation of the noise cancellation system 300 will be described with reference to FIG. 15.

In S910, the reference microphone 910 collects noise in the predetermined space and outputs a reference signal.

In S920, the error microphone 920 collects sound at a position where quiet is desired and outputs an error signal.

In S330, the cancellation filter coefficient selection apparatus 330 receives the reference signal output in S910, the error signal output in S920, and the cancellation signal generated by filtering the reference signal using the cancellation filter coefficient selected immediately previously as inputs, and selects and outputs a cancellation filter coefficient using the reference signal, the error signal, and the cancellation signal.

In S940, the cancellation filter 940 receives the reference signal output in S910 and the cancellation filter coefficient output in S330 as inputs, and generates and outputs a cancellation signal based on the reference signal through filtering using the cancellation filter coefficient.

In S950, the speaker 950 receives the cancellation signal output in S940 as an input and emits sound based on the cancellation signal.

Figure 16:
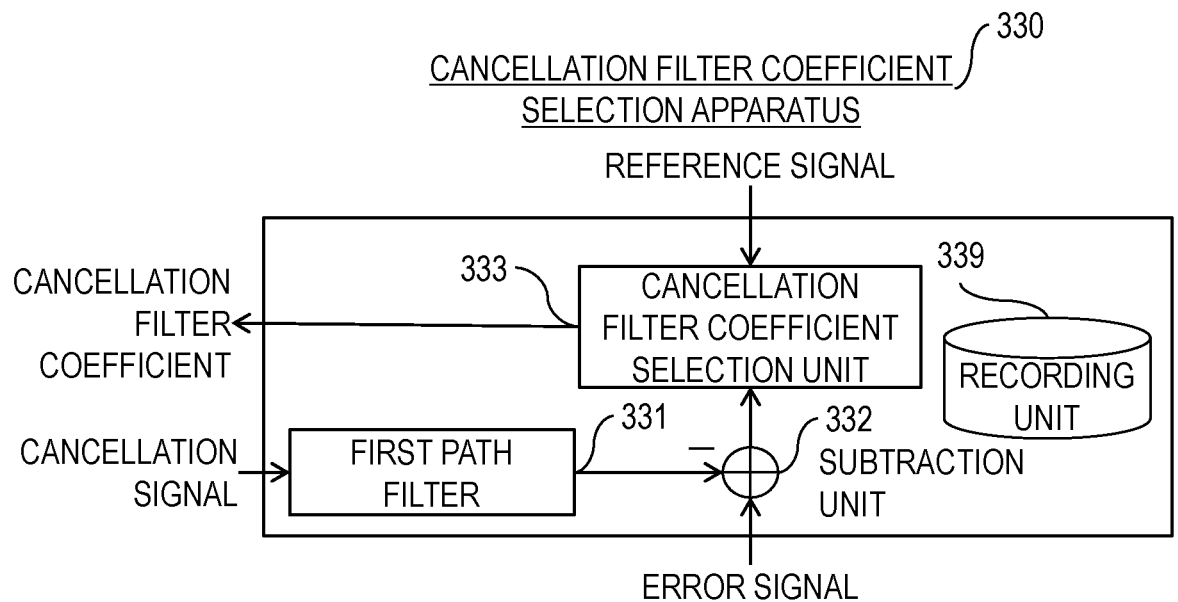
FIG. 16 is a block diagram showing an example of a configuration of a cancellation filter coefficient selection apparatus 330.
Figure 17:
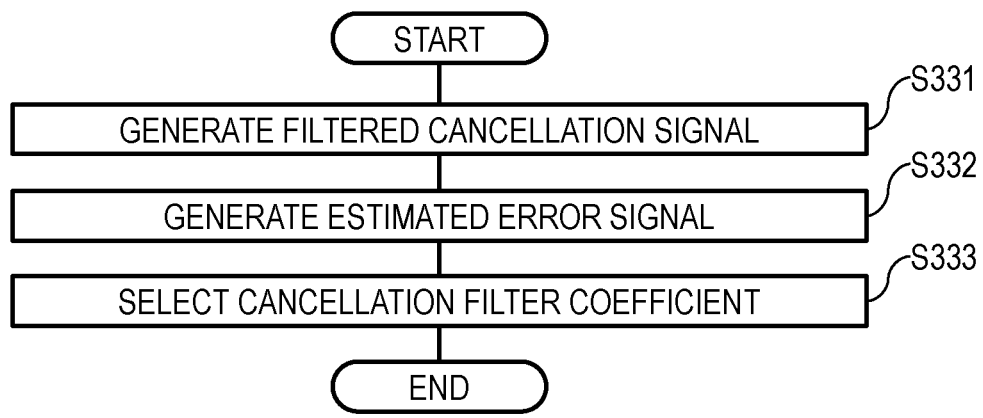
FIG. 17 is a flowchart showing an example of operation of the cancellation filter coefficient selection apparatus 330.

Hereinafter, the cancellation filter coefficient selection apparatus 330 will be described with reference to FIGS. 16 and 17. FIG. 16 is a block diagram showing a configuration of the cancellation filter coefficient selection apparatus 330. FIG. 17 is a flowchart showing operation of the cancellation filter coefficient selection apparatus 330. As shown in FIG. 16, the cancellation filter coefficient selection apparatus 330 includes a first path filter 331, a subtraction unit 332, a cancellation filter coefficient selection unit 333, and a recording unit 339. One or more cancellation filter coefficients are recorded in advance in the recording unit 339. The method for generating the cancellation filter coefficient recorded in advance in the recording unit 339 may be the same as the generation method described in the first embodiment.

The operation of the cancellation filter coefficient generation apparatus 330 will be described with reference to FIG. 17.

In S331, the first path filter 331 receives the cancellation signal as an input, and generates and outputs a filtered cancellation signal based on the cancellation signal through filtering using a path filter coefficient (hereinafter referred to as a first path filter coefficient) indicating an acoustic characteristic of the path from the speaker 950 to the error microphone 920.

In S332, the subtraction unit 332 receives the error signal and the filtered cancellation signal output in S331 as inputs, and subtracts the filtered cancellation signal from the error signal to generate and output an estimated error signal. The estimated error signal is a signal estimated to be obtained by collecting the sound from the noise source with the error microphone 920 in the case where the noise cancellation system 300 is not present.

In S333, the cancellation filter coefficient selection unit 333 receives the reference signal and the estimated error signal output in S332 as inputs, and uses the reference signal and the estimated error signal to select and output the cancellation filter coefficient for best cancelling the noise from among the cancellation filter coefficients recorded in the recording unit 339.

Figure 18:
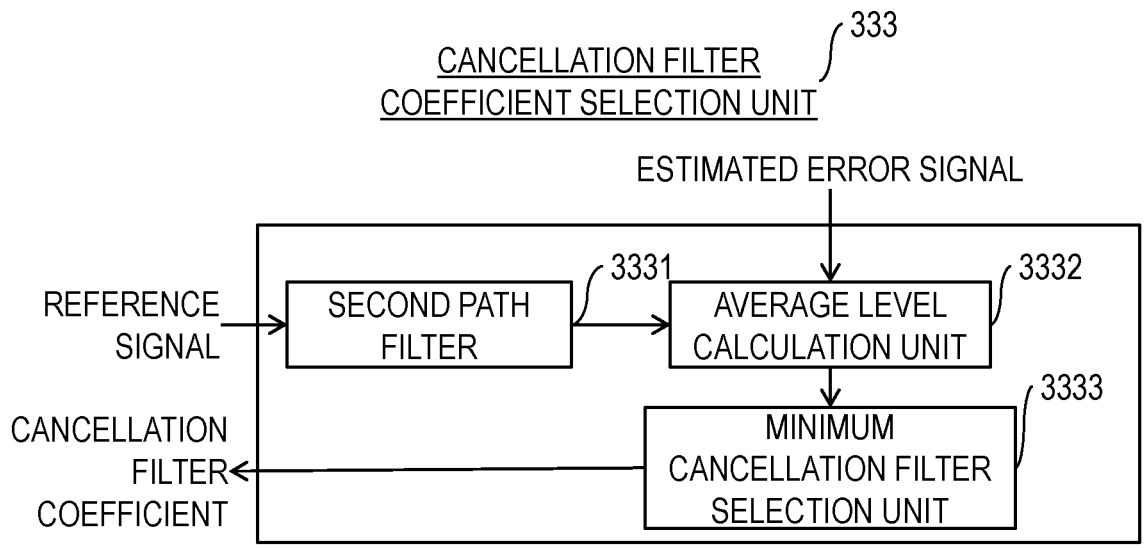
FIG. 18 is a block diagram showing an example of a configuration of a cancellation filter coefficient selection unit 333.
Figure 19:
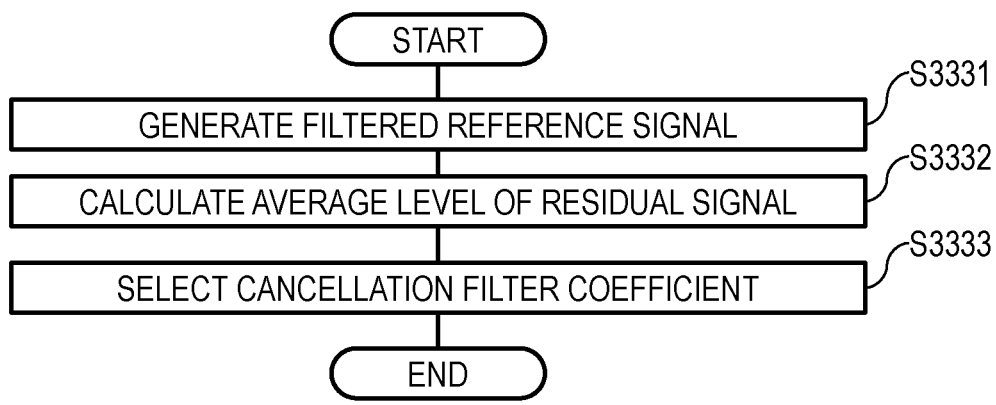
FIG. 19 is a flowchart showing an example of operation of the cancellation filter coefficient selection unit 333.

Hereinafter, the cancellation filter coefficient selection unit 333 will be described with reference to FIGS. 18 and 19. FIG. 18 is a block diagram showing a configuration of the cancellation filter coefficient selection unit 333. FIG. 19 is a flowchart showing operation of the cancellation filter coefficient selection unit 333. As shown in FIG. 18, the cancellation filter coefficient selection unit 333 includes a second path filter 3331, an average level calculation unit 3332, and a minimum cancellation filter coefficient selection unit 3333.

The operation of the cancellation filter coefficient generation unit 333 will be described with reference to FIG. 19.

In S3331, the second path filter 3331 receives the reference signal as an input, and generates and outputs the filtered reference signal based on the reference signal through filtering using a path filter coefficient (hereinafter referred to as a second path filter coefficient) indicating an acoustic characteristic of the path from the speaker 950 to the error microphone 920. The second path filter coefficient is preferably the same as the first path filter coefficient.

In S3332, the average level calculation unit 3332 receives the filtered reference signal output in S3331 and the estimated error signal as inputs. The average level calculation unit 3332 calculates, for each of the cancellation filter coefficients recorded in the recording unit 339, the average level of a residual signal obtained by adding the estimated error signal and a signal generated based on the filtered reference signal through filtering using the cancellation filter coefficient, and outputs a set of the cancellation filter coefficient and the average level of the residual signal corresponding to the cancellation filter coefficient. The residual signal corresponding to the cancellation filter coefficient is a signal that is estimated to be obtained by the error microphone 920 collecting the sound from the noise source and the sound based on a signal generated based on the filtered reference signal through filtering using the cancellation filter coefficient.

In S3333, the minimum cancellation filter coefficient selection unit 3333 receives the set of the cancellation filter coefficient and the average level of the residual signal corresponding to the cancellation filter coefficient output in S3332 as an input, and selects and outputs the cancellation filter coefficient according to which the average level of the residual signal is minimized as the cancellation filter coefficient for best cancelling noise.

According to the embodiment of the present invention, it is possible to select a cancellation filter coefficient that can stably cancel noise for a user using a seat of an aircraft, an automobile, or the like. According to the embodiment of the present invention, since it is not necessary to generate the cancellation filter coefficient at the time of noise cancellation, stable noise cancellation that is not influenced by the voice of the user is possible. Also, according to the embodiment of the present invention, it is possible to select the cancellation filter coefficient that is the most effective for cancelling noise without using a rotary encoder, a camera, a millimeter wave radar, a LiDAR, or the like for acquiring the position of the seat or the position of the head.

Appendix

Figure 20:
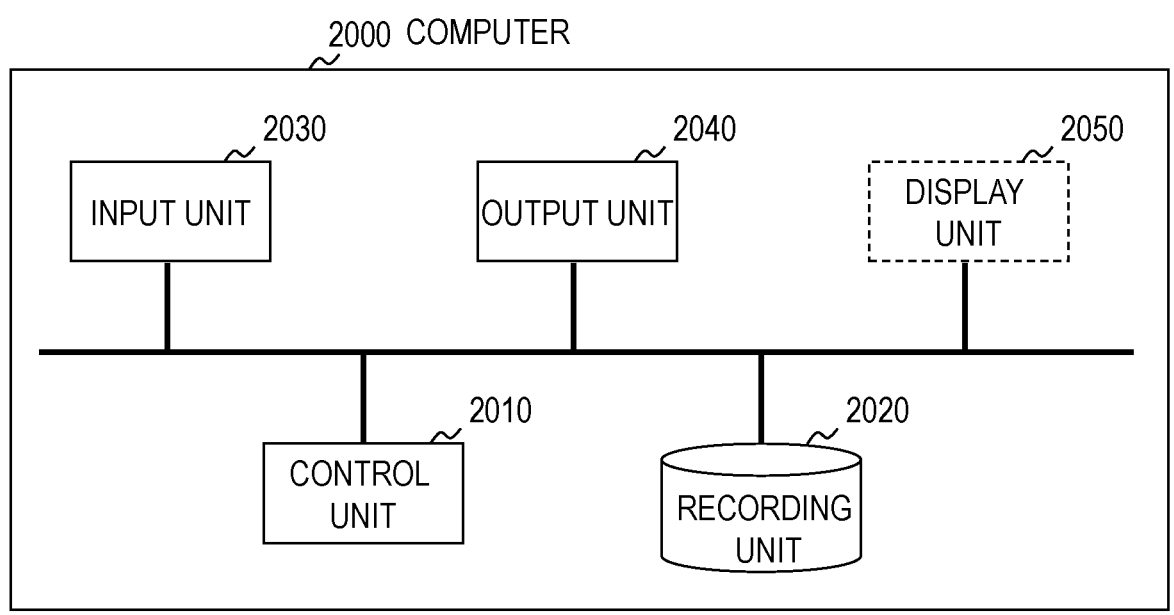
FIG. 20 is a diagram showing an example of a functional configuration of a computer that realizes each apparatus according to the embodiment of the present invention.

FIG. 20 is a diagram showing an example of a functional configuration of a computer 2000 that realizes each of the above-mentioned apparatuses. The processing in each of the above-mentioned apparatuses can be implemented by having the recording unit 2020 read a program for causing a computer to function as each of the above-mentioned apparatuses and causing the control unit 2010, the input unit 2030, the output unit 2040, and the like to operate.

The apparatus of the present invention includes, for example, as a single hardware entity, an input unit to which a keyboard or the like can be connected, an output unit to which a liquid crystal display or the like can be connected, a communication unit to which a communication device (e.g., a communication cable) capable of communicating with the exterior of the hardware entity can be connected, a CPU (Central Processing Unit; may also include a cache memory, registers, etc.), a RAM or ROM serving as a memory, an external storage device, which is a hard disk, and a bus that connects the input unit, the output unit, the communication unit, the CPU, the RAM, the ROM, and the external storage device such that data can be exchanged therebetween. Also, if necessary, a device (drive) or the like capable of reading and writing a recording medium such as a CD-ROM may also be provided in the hardware entity. A general-purpose computer or the like is an example of a physical entity including such hardware resources.

The external storage device of the hardware entity stores a program that is needed to realize the above-mentioned functions and data needed for the processing of this program (not limited to the external storage device, and for example, the program may also be stored in a ROM, which is a read-only storage device). Also, the data and the like obtained through the processing of these programs is stored as needed in a RAM, an external storage device, or the like.

In the hardware entity, each program stored in the external storage device (or ROM, etc.) and the data needed for processing of each program are loaded to the memory as needed, and the CPU interprets, executes, and processes them as appropriate. As a result, the CPU realizes a predetermined function (each constituent unit represented above as a unit, means, etc.).

The present invention is not limited to the above-described embodiment, and can be modified as appropriate without departing from the gist of the present invention. Also, the processes described in the above-described embodiment are not only executed in chronological order according to the order described, but may also be executed in parallel or individually according to necessity or the processing performance of the device that executes the processing.

As described above, when the processing function in the hardware entity (apparatus of the present invention) described in the above-described embodiment is realized by a computer, the processing content of the function to be included in the hardware entity is described by a program.

By executing this program on the computer, the processing function in the above-described hardware entity is realized on the computer.

The program describing the processing content can be recorded on a computer-readable recording medium. The recording medium that can be read by a computer may be, for example, a magnetic recording device, an optical disk, a photomagnetic recording medium, a semiconductor memory, or the like. Specifically, for example, a hard disk device, a flexible disk, a magnetic tape, or the like can be used as a magnetic recording device, and a DVD (Digital Versatile Disc), a DVD-RAM (Random Access Memory), a CD-ROM (Compact Disc Read Only Memory), CD-R (Recordable)/RW (ReWritable), or the like can be used as an optical disk, an MO (Magneto-Optical disc) or the like can be used as magneto-optical recording medium, and an EEP-ROM (Electronically Erasable and Programmable-Read Only Memory) or the like can be used as a semiconductor memory.

Also, the distribution of this program is carried out, for example, by selling, transferring, or renting a portable recording medium such as a DVD or a CD-ROM on which the program is recorded, or the like. Furthermore, the program may be stored in the storage device of a server computer, and the program may be distributed by transferring the program from the server computer to another computer via a network.

A computer that executes such a program first temporarily stores, for example, a program recorded on a portable recording medium or a program transferred from a server computer in a storage device of the computer. Then, when the processing is executed, the computer reads the program stored in the storage device and executes the processing according to the read program. Also, as another mode of executing this program, a computer may read the program directly from a portable recording medium and execute processing according to the program, and furthermore, processing according to a received program may be executed sequentially each time the program is transferred from the server computer to this computer. Also, the above processing may be executed by a so-called ASP (Application Service Provider) service that realizes the processing function through only an execution instruction and result acquisition, without transferring the program from the server computer to this computer. Note that the program in this embodiment includes information provided for processing performed by an electronic computer, the information being equivalent to a program (data or the like that is not a direct command to the computer but has a property that defines the processing of the computer).

Also, in this mode, the hardware entity is formed by executing a predetermined program on the computer, but at least some of the processing content may also be realized using hardware.

The description of the embodiment of the present invention described above is presented for purposes of illustration and description. It is not intended to be exhaustive, nor to limit the invention to the exact form disclosed. Modifications and variations are possible based on the above instructions. The embodiments were selected and expressed in order to provide the best description of the principle of the present invention, and in order to enable a person skilled in the art of this field to use the present invention in various embodiments and with various modifications added so as to be suitable for actual use arrived upon as a result of deep consideration. All such modifications and variations are within the scope of the invention as defined by the appended claims, interpreted according to a breadth given fairly, legally, and impartially.

The invention claimed is:

1. A cancellation filter coefficient selection apparatus, wherein a signal output by a reference microphone for collecting noise in a predetermined space is used as a reference signal, a signal output by an error microphone for collecting sound at a position where quiet is desired is used as an error signal, and a signal generated by filtering the reference signal using a cancellation filter coefficient selected immediately previously is used as a cancellation signal, the cancellation filter coefficient selection apparatus comprising:
 a recording circuitry configured to record cancellation filter coefficients;
 a first path filter configured to generate a filtered cancellation signal based on the cancellation signal through filtering using a path filter coefficient indicating an acoustic characteristic of a path from a speaker for emitting sound based on the cancellation signal to the error microphone;
 a subtraction circuitry configured to generate an estimated error signal by subtracting the filtered cancellation signal from the error signal; and
 a cancellation filter coefficient selection circuitry configured to use the reference signal and the estimated error signal to select a cancellation filter coefficient for best cancelling noise from among the cancellation filter coefficients recorded in the recording circuitry, wherein the cancellation filter coefficient selection circuitry includes:
 a second path filter configured to generate a filtered reference signal based on the reference signal through filtering using a path filter coefficient indicating an acoustic characteristic of a path from the speaker to the error microphone:
 an average level calculation circuitry configured to calculate, for each of the cancellation filter coefficients recorded in the recording circuitry, an average level of a residual signal obtained by adding the estimated error signal and a signal generated based on the filtered reference signal through filtering using the cancellation filter coefficient; and
 a minimum cancellation filter coefficient selection circuitry configured to, from among the cancellation filter coefficients recorded in the recording circuitry, select a cancellation filter coefficient according to which the average level of the residual signal is minimized as a cancellation filter coefficient for best cancelling noise.

2. A non-transitory computer-readable storage medium which stores a program for causing a computer to function as the cancellation filter selection apparatus according to claim 1.

3. A cancellation filter coefficient selection method, wherein a signal output by a reference microphone for collecting noise in a predetermined space is used as a reference signal, a signal output by an error microphone for collecting sound at a position where quiet is desired is used as an error signal, and a signal generated by filtering the reference signal using a cancellation filter coefficient selected immediately previously is used as a cancellation signal, the method comprising:
- a first path filtering step of, by a cancellation filter coefficient selection apparatus, generating a filtered cancellation signal based on the cancellation signal through filtering using a path filter coefficient indicating an acoustic characteristic of a path from a speaker for emitting sound based on the cancellation signal to the error microphone;
- a subtraction step of, by the cancellation filter coefficient selection apparatus, generating an estimated error signal by subtracting the filtered cancellation signal from the error signal; and
- a cancellation filter coefficient selection step of, by the cancellation filter coefficient selection apparatus, using the reference signal and the estimated error signal to select a cancellation filter coefficient for best cancelling noise from among cancellation filter coefficients recorded in a recording circuitry,
- wherein the cancellation filter coefficient selection step includes:
- a second path filtering step of generating a filtered reference signal based on the reference signal through filtering using a path filter coefficient indicating an acoustic characteristic of a path from the speaker to the error microphone:
- an average level calculation step of calculating, for each of the cancellation filter coefficients recorded in the recording circuitry, an average level of a residual signal obtained by adding the estimated error signal and a signal generated based on the filtered reference signal through filtering using the cancellation filter coefficient; and
- a minimum cancellation filter coefficient selection step of selecting, from among the cancellation filter coefficients recorded in the recording circuitry, a cancellation filter coefficient according to which the average level of the residual signal is minimized as a cancellation filter coefficient for best cancelling noise.

* * * * *